(12) United States Patent
Osamura et al.

(10) Patent No.: US 9,991,835 B2
(45) Date of Patent: Jun. 5, 2018

(54) CONTROL DEVICE FOR ELECTRIC COMPRESSOR

(71) Applicants: CALSONIC KANSEI CORPORATION, Saitama (JP); UTSUNOMIYA UNIVERSITY, Tochigi (JP)

(72) Inventors: Kensuke Osamura, Saitama (JP); Yousuke Ooneda, Saitama (JP); Mitsuo Hirata, Tochigi (JP); Naoya Tashiro, Tochigi (JP)

(73) Assignees: CALSONIC KANSEI CORPORATION, Saitama (JP); UTSUNOMIYA UNIVERSITY, Tochigi (JP)

( * ) Notice: Subject to any disclaimer, the term of this patent is extended or adjusted under 35 U.S.C. 154(b) by 0 days. days.

(21) Appl. No.: 14/439,945

(22) PCT Filed: Oct. 22, 2013

(86) PCT No.: PCT/JP2013/078543
§ 371 (c)(1),
(2) Date: Apr. 30, 2015

(87) PCT Pub. No.: WO2014/073365
PCT Pub. Date: May 15, 2014

(65) Prior Publication Data
US 2015/0280631 A1    Oct. 1, 2015

(30) Foreign Application Priority Data
Nov. 7, 2012   (JP) .................................. 2012-245009

(51) Int. Cl.
G05B 5/00       (2006.01)
H02P 23/00     (2016.01)
(Continued)

(52) U.S. Cl.
CPC .......... *H02P 23/0068* (2013.01); *H02P 23/14* (2013.01); *H02P 23/22* (2016.02); *H02P 31/00* (2013.01)

(58) Field of Classification Search
CPC ........................... G05D 23/19; G05D 23/1917
(Continued)

(56) References Cited

U.S. PATENT DOCUMENTS 4,686,834 A * 8/1987 Haley ..................... F04D 27/02
                                                                62/209
5,306,116 A * 4/1994 Gunn ..................... F04D 27/02
                                                                415/17
(Continued)

FOREIGN PATENT DOCUMENTS

JP      4-323705 A    11/1992
JP      9-201086 A    7/1997
(Continued)

*Primary Examiner* — Eduardo Colon Santana
*Assistant Examiner* — Devon Joseph
(74) *Attorney, Agent, or Firm* — Kenealy Vaidya LLP

(57) ABSTRACT

A control device for an electric compressor, capable of successfully controlling a drive motor of the compressor in response to the load fluctuation having complicated frequency components even when the motor is controlled in a sensorless manner, is provided. The control device for an electric compressor includes: a repetitive control portion 5 to which a rotation speed difference between a target rotation speed of a motor which drives the compressor and the estimated rotation speed is input to perform a repetitive operation using the rotation speed difference of one preceding cycle of the compressor, thereby reducing the rotation speed difference; a pressure detecting portion 1 for the compressor; and a reset signal generation portion 4 calculating a timing of one rotation of the compressor by counting the number of predetermined parts of load fluctuations of the compressor based on the pressure value of the compressor, (Continued)

thereby outputting a reset signal to the repetitive control portion according to the timing.

2 Claims, 13 Drawing Sheets

(51) Int. Cl.
 *H02P 23/22* (2016.01)
 *H02P 23/14* (2006.01)
 *H02P 31/00* (2006.01)
(58) Field of Classification Search
 USPC .......................................... 318/461, 400.25
 See application file for complete search history.

(56) References Cited

U.S. PATENT DOCUMENTS

| | | | | |
|---|---|---|---|---|
| 5,506,487 | A * | 4/1996 | Young | H02P 6/28 318/400.13 |
| 6,081,087 | A * | 6/2000 | Iijima | H02P 6/16 318/400.13 |
| 8,084,977 | B2 * | 12/2011 | Hashimoto | F04B 35/04 318/400.2 |
| 9,287,811 | B2 * | 3/2016 | Osamura | H02P 21/141 |
| 2001/0002097 | A1 * | 5/2001 | Tsutsui | G05B 5/01 318/560 |
| 2006/0061923 | A1 * | 3/2006 | Wang | H02P 29/02 361/23 |
| 2006/0236708 | A1 * | 10/2006 | Mizuno | B60H 1/3219 62/228.3 |
| 2007/0180837 | A1 * | 8/2007 | Allen | F25B 49/005 62/135 |
| 2011/0031919 | A1 * | 2/2011 | Green | H02P 21/0089 318/432 |
| 2011/0031920 | A1 * | 2/2011 | Henderson | H02P 21/0089 318/434 |
| 2011/0062902 | A1 * | 3/2011 | Patel | H02P 6/185 318/400.02 |
| 2011/0062909 | A1 * | 3/2011 | Patel | B60L 11/123 318/400.32 |
| 2011/0248652 | A1 * | 10/2011 | Sumioka | H02N 2/142 318/116 |

FOREIGN PATENT DOCUMENTS

| | | |
|---|---|---|
| JP | 2008-92718 A | 4/2008 |
| JP | 2010-88200 A | 4/2010 |

* cited by examiner

*FIG. 4*

| d₁ | d₂ | d₃ | d₄ | ··· | dⱼ | ··· | d₉₈ | d₉₉ | d₁₀₀ |

*FIG. 9*

| d0 | d1 | d2 |
|----|----|----|
| d3 | d4 | d5 |

CONTROL DEVICE FOR ELECTRIC COMPRESSOR

TECHNICAL FIELD

The present invention relates to a control device for an electric compressor.

BACKGROUND ART

When controlling a motor of an electric compressor or the like, the motor is controlled by detecting a rotation position or a rotation speed of a rotor of the motor using a sensor such as a position sensor or a speed sensor. In this case, since a decrease in reliability accompanied with a high temperature environment, disconnection or the like, an increase in the size of the device (dimensions of the outer frame of the motor, especially axial length), an increase in cost and the like are caused, sensorless control is applied these days. Since the sensorless control is influenced by speed estimation characteristics, it is difficult to suppress oscillation. Therefore, as a measure for that, the technology disclosed in Patent Document 1 is known.

In order to control a motor of a compressor in a sensorless manner, the conventional control device for an electric compressor disclosed in Patent Document 1 has a first command current setting portion which sets a first command current for reducing a rotation speed deviation between a target rotation speed and an actual rotation speed, a second current setting portion which sets a second command current of the motor based on the load fluctuation frequency set from mechanical fluctuation factors of the compressor, a third command current calculation portion which sets a third command current of the motor from the first command current and the second command current, and an inverter switching pattern generation portion which generates a command for motor driving from at least the third command current and the actual rotation speed (estimated from the motor inverter).

In the second command current setting portion, the rotation speed deviation is input to a peak filter using a load fluctuation frequency as a peak frequency to set, as the second command current, the output of the peak filter obtained using a transfer function expressed by the following expression.

That is, the transfer function of the peak filter is expressed as follows:

$$\text{Peak Filter}(s) = k\omega/(s^2+\omega^2)$$

Here, $\omega$ indicates a peak frequency (rad/s) and is determined as a load fluctuation frequency. s indicates the Laplacian operator and k indicates a gain.

RELATED DOCUMENTS

Patent Documents

Patent Document 1: JP-A-2010-88200

SUMMARY OF THE INVENTION

Problems that the Invention is to Solve

However, the conventional control device for an electric compressor has a problem as described below.

That is, in the conventional control device, the oscillation of the compressor is reduced by reducing the fluctuation of the rotation speed using the peak filter.

However, since the frequency range that can be handled by the peak filter is narrow, an estimation error is generated when a frequency outside of this range is input. Thus, the estimation accuracy of the rotation speed is reduced.

The actual load fluctuation has a plurality of frequency components. Accordingly, when the peak filter is used, it is necessary to connect and use peak filters having different handling frequencies in parallel. However, in that case, tuning becomes complicated and difficult.

The invention is contrived in view of the problem and an object thereof is to provide a control device for an electric compressor capable of successfully controlling a drive motor of the compressor in response to the load fluctuation having complicated frequency components even when the motor is controlled in a sensorless manner.

Means for Solving the Problems

For this object, a control device for an electric compressor according to the invention includes a target rotation speed setting portion which sets a target rotation speed of a motor which drives the compressor; an estimated rotation speed calculation portion which calculates an estimated rotation speed of the motor; a drive command signal generation portion which generates a drive command signal of the electric motor to remove a rotation speed difference between the target rotation speed and the estimated rotation speed; a repetitive control portion to which the rotation speed difference is input to perform a repetitive operation using the rotation speed difference of one preceding cycle of the compressor, thereby reducing the rotation speed difference; a pressure detecting portion which detects a pressure value of the compressor; and a reset signal generation portion to which the pressure value of the compressor is input to calculate a timing of one rotation of the compressor by counting the number of predetermined parts of load fluctuations of the compressor based on the pressure value, thereby outputting a reset signal to the repetitive control portion according to the timing.

Advantages of the Invention

In a control device for an electric compressor of the invention, a repetitive control portion performs a repetitive operation using a rotation speed difference between a target rotation speed of one preceding cycle and an estimated rotation speed to reduce the rotation speed difference to thus suppress a disturbance. However, in that case, since the cycle switching timing in the repetitive control portion is determined according to the pressure fluctuation of the compressor, the drive motor of the compressor can be successively controlled with respect to the load fluctuation having complicated frequency components even when the motor is controlled in a sensorless manner.

BRIEF DESCRIPTION OF THE DRAWINGS

FIG. 4 is a diagram illustrating a method of storing data values d for one cycle in the repetitive control portion.

FIG. 9 is a diagram showing the relationship between data values d and storage positions in a memory in the repetitive control portion.

MODES FOR CARRYING OUT THE INVENTION

Figure 1:
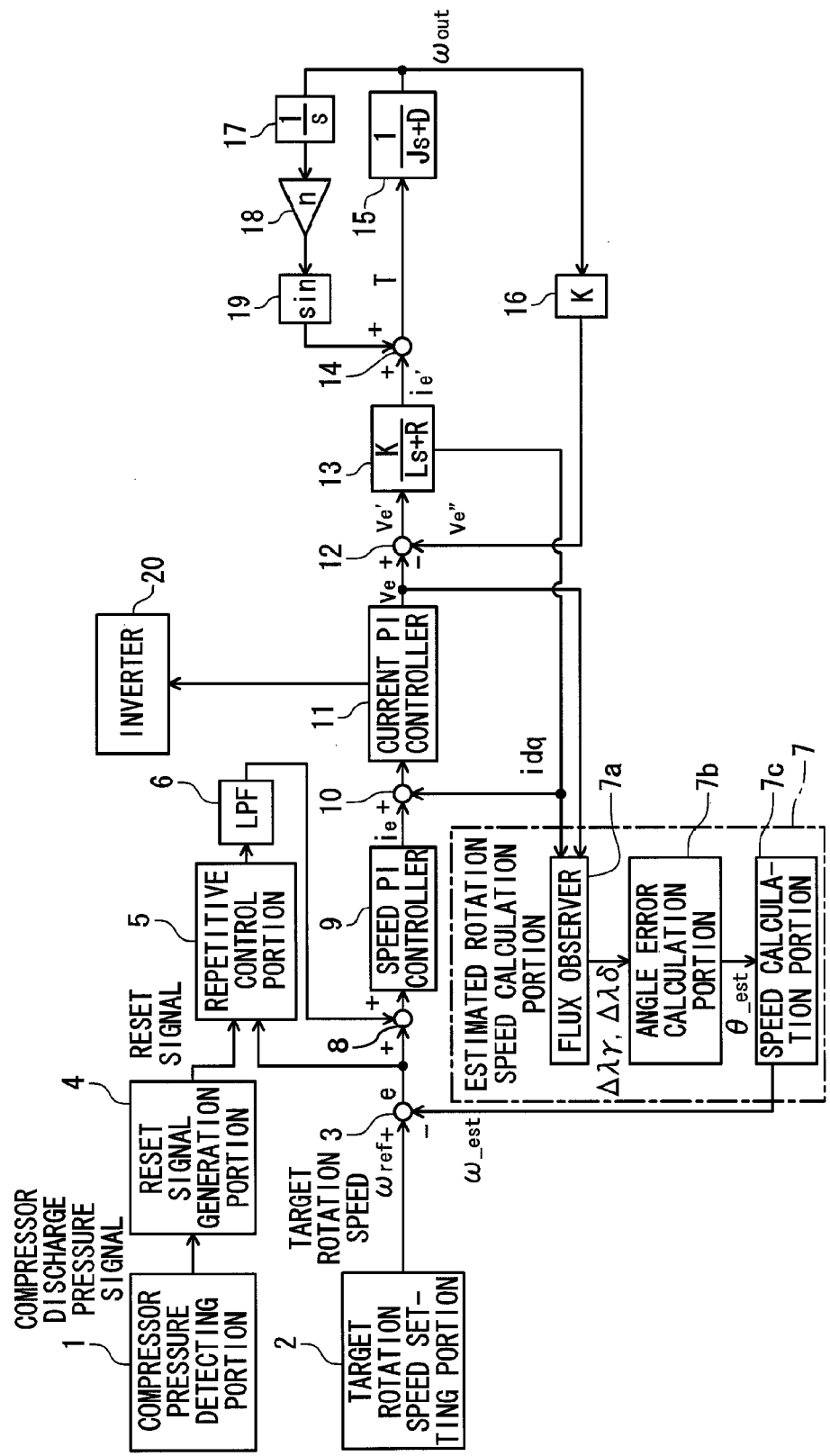
FIG. 1 is a block diagram showing a configuration of a control device for an electric compressor of Example 1 of the invention.

Hereinafter, embodiments of the invention will be described in detail based on the examples shown in the drawings.

Example 1

A control device for an electric compressor of Example 1 controls an interior permanent magnet synchronous motor (IPMSM) which drives a compressor of a vehicular air conditioning device in a sensorless manner.

Here, in the above-described control, repetitive control advantageous for suppressing the cyclic disturbance is used since the signal is cyclic due to the rotation of the compressor.

In the repetitive control of this example, in the suppression of the disturbance of a rotation speed difference, a reset signal for switching the cycle of the repetitive operation is different from that in a conventional normal method. That is, in the invention (Example 1), the reset signal is generated using a pressure signal of the compressor.

Hereinafter, an overall configuration of the control device for an electric compressor of Example 1 will be described.

As shown in FIG. 1, the control device for an electric compressor of Example 1 has a compressor pressure detecting portion 1, a target rotation speed setting portion 2, a subtracter 3, a reset signal generation portion 4, a repetitive control portion 5, a low-pass filter 6, and an estimated rotation speed calculation portion 7.

The compressor pressure detecting portion 1 detects the magnitude of a pressure of the compressor (not shown) and outputs a pressure value having a pressure waveform detected herein to the reset signal generation portion 4.

The target rotation speed setting portion 2 calculates and sets a target rotation speed $\omega_{ref}$ of the motor as a control target.

That is, a detected actual air temperature and a target air temperature are compared to set the target rotation speed $\omega_{ref}$ of the motor by proportional integral (PI) control, so that the temperature of the air after passing through an evaporator (outside of the drawing) of the vehicular air conditioning device reaches a desired value. The target rotation speed $\omega_{ref}$ is input to the subtracter 3.

The subtracter 3 calculates a rotation speed difference as a control deviation by subtracting an estimated rotation speed $\omega\_{est}$ calculated by the estimated rotation speed calculation portion 7 from the target rotation speed $\omega_{ref}$ input from the target rotation speed setting portion 2.

Based on the pressure value input from the compressor pressure detecting portion 1, the reset signal generation portion 4 determines the timing of one rotation (corresponding to one cycle of the repetitive operation in the repetitive control portion 5) of the compressor by counting the number of predetermined parts according to the inlet pressure or discharge pressure with respect to the pressure fluctuation of the compressor, and outputs a reset signal to the repetitive control portion 5 according to this timing.

The generation of the reset signal will be described in detail later.

The repetitive control portion 5 which is a type of time delay system performs a repetitive operation using a set control deviation of one preceding cycle to follow the cyclic target input.

Figure 2:
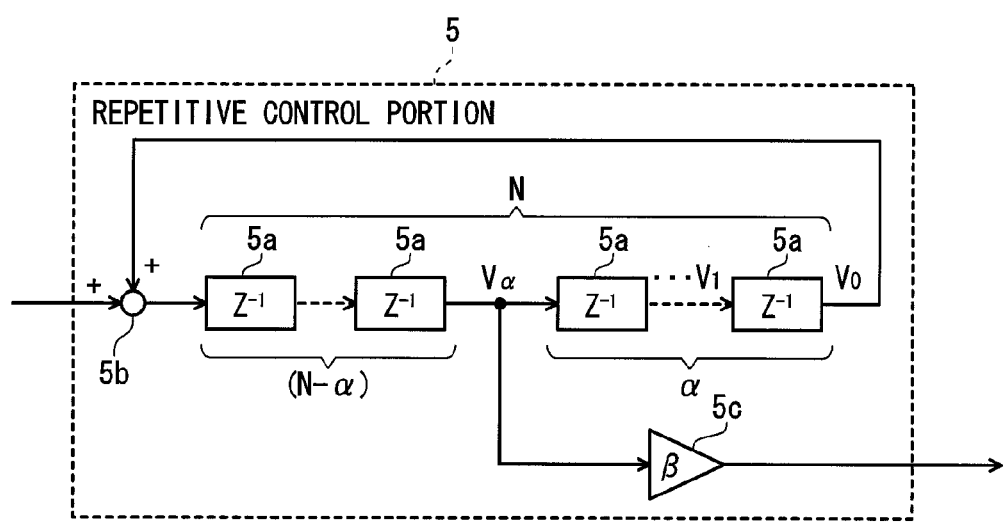
FIG. 2 is a block diagram showing a configuration of a repetitive control portion of the control device for an electric compressor of Example 1.

That is, when a minimum rotation number for performing the repetitive control is indicated by Wref_min and a sampling cycle is indicated by Ts, the repetitive control portion 5 has n delay devices 5a (Z in FIG. 2 is Z-transform) determined by $2\pi/(Wref\_min \times Ts)$, an adder 5b, and a coefficient multiplier 5c as shown in FIG. 2.

The n delay devices 5a are connected in series and output a signal $V_0$ from the delay device positioned at the rear end to the adder 5b. As shown in FIG. 2, signals $V_N$ to $V_0$ are defined in order corresponding to positions of the delay devices from the upstream side of the front delay device 5a to the downstream side of the rear delay device 5a.

The adder 5b adds the rotation speed difference calculated by the subtracter 3 to the value of the signal $V_0$ and outputs the result to the delay devices 5a positioned at the front end.

A signal $V_\alpha$ is input to the coefficient multiplier 5c and its value is multiplied by a coefficient $\beta$. The result is output to the LPF 6 as an output u of the repetitive control portion 5. As shown in FIG. 2, the signal $V_\alpha$ is a signal positioned between the $\alpha$-th delay device 5a and the $\alpha+1$-th delay device 5a counted from the rear delay device 5a to the upstream side.

Figure 3:
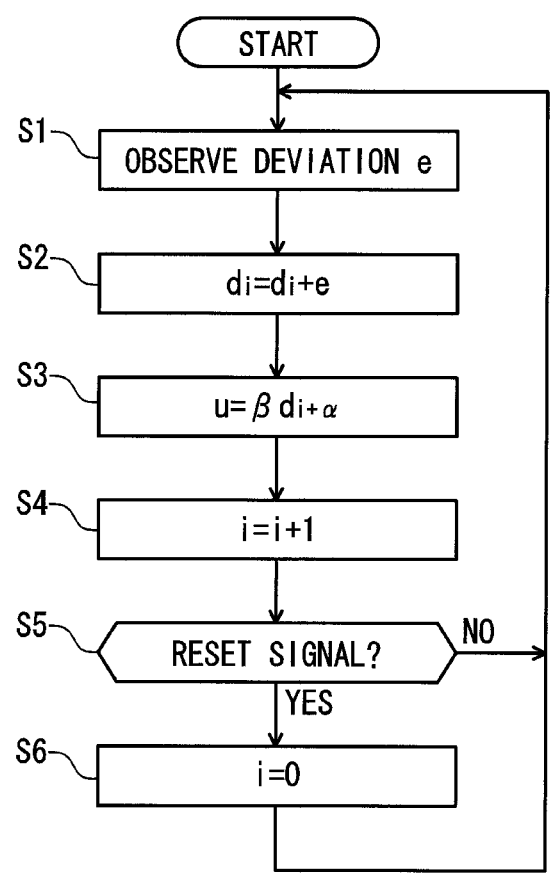
FIG. 3 is a diagram showing a flowchart of a repetitive control process which is executed by the repetitive control portion.

In the repetitive control portion 5, the flowchart shown in FIG. 3 is executed.

First, in Step S1, a deviation e (difference of rotation number in Example 1) is observed for each sampling cycle Ts.

Next, the process proceeds to Step S2.

In Step S2, a value obtained by adding the deviation e observed in Step S1 to an i-th value $d_i$ among values d stored for one preceding cycle (N items) is stored as a new value $d_i$.

Next, the process proceeds to Step S3.

In Step S3, a value obtained by multiplying an i+α-th value $d_{i+\alpha}$ by a coefficient β is provided as an output u. That is, $u=\beta d_{i+\alpha}$ is obtained.

As will be described later, in a case of i+α>N, the output value is output to the coefficient multiplier 5b as $u=\beta d_{i+\alpha-N}$. Here, $d_{i+\alpha-N}$ indicates a value $d_{i+\alpha}$ obtained in a cycle after the data of one preceding cycle. This will be described later.

Next, the process proceeds to Step S4.

In Step S4, i+1 is set to i and the positions of the values of d are shifted by one to the downstream side.

Next, the process proceeds to Step S5.

In Step S5, it is determined whether a new reset signal has been input from the reset signal generation portion 4. If the result is YES, the process proceeds to Step S6, but if the result is NO, the process returns to Step S1.

In Step S6, i is reset to 0 and the process returns to Step S1 to perform the calculation of the next new cycle.

These steps are repeatedly executed during the control of the motor.

Here, the output in Step S3 will be described in detail below.

Here, a case in which α is 2 and N is 100 will be used as an example for description.

Figure 4:
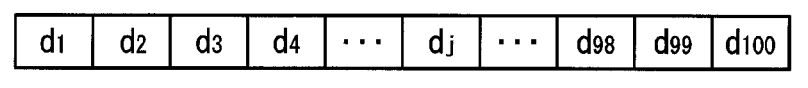

Accordingly, as shown in FIG. 4, regarding the values d, values from $d_1$ to $d_{100}$ for one preceding cycle are stored in order.

Here, in a case of i=1, that is, $d_1$, i+α=i+2=3 is obtained. Accordingly, a value at the position of $d_3$ is taken and multiplied by a coefficient β, and the obtained value becomes the output u.

Similarly, in a case of i=4, that is, $d_4$, i+2=4+2=6 is obtained. Accordingly, a value at the position of $d_6$ is taken and used for calculation of the output u.

Similarly, in a case of i=5, 6, 7, etc., values of $d_7$, $d_8$, $d_9$, etc. are taken.

Figure 5:
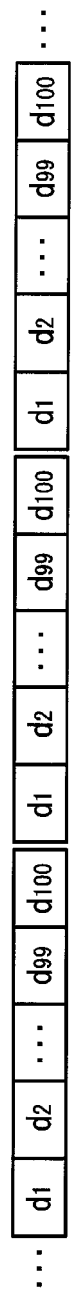
FIG. 5 is a diagram illustrating a method of storing data values d in the repetitive control portion when the number of cycles is more than one.

However, in a case of i=99 (that is, the above-described condition of i+α>N is satisfied), $d_{101}$ does not exist. In this case, in an operation for storing the actual values d, the next values d are sequentially given as $d_1$, $d_2$, etc. after the value $d_{100}$ of one preceding cycle as shown in FIG. 5. Accordingly, a value of the next $d_1$ is taken for $d_{101}$.

Figure 6:
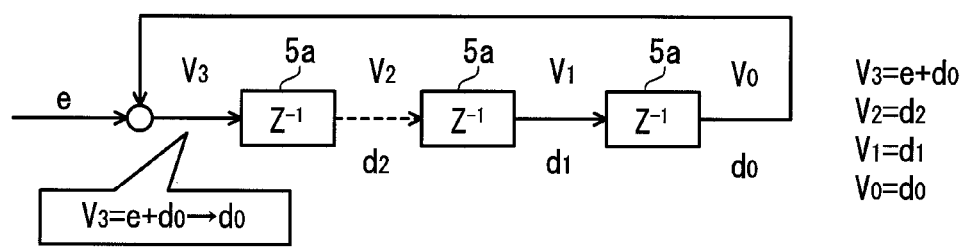
FIG. 6 is a diagram illustrating the relationship between signals V and data values d in the repetitive control portion in a case of i=0.
Figure 7:
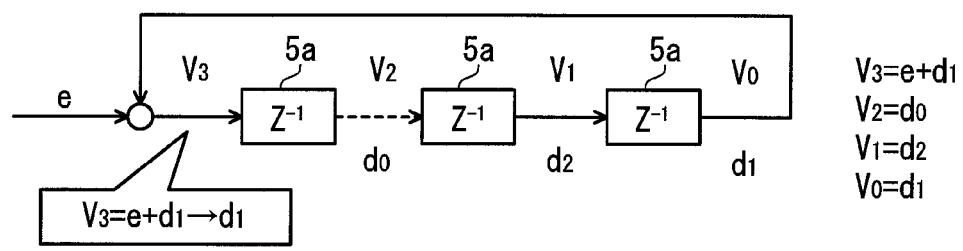
FIG. 7 is a diagram illustrating the relationship between signals V and data values d in the repetitive control portion in a case of i=1.
Figure 8:
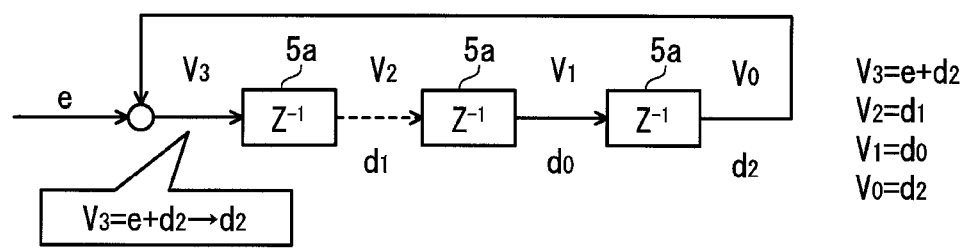
FIG. 8 is a diagram illustrating the relationship between signals V and data values d in the repetitive control portion in a case of i=2.

When the above-described operation is shown while comparing with the respective delay devices 5a of FIG. 2, it is shown as in the block diagrams shown in FIGS. 6, 7, and 8. In these drawings, a flow in an angle region in a case of N=3 is shown for simplicity.

In a case of i=0 (that is, $d_0$), the operation is as shown in FIG. 6. That is, each of signals $V_0$ to $V_3$ has a fixed position as an invariable signal on the block line, and values d correspond to these signals $V_0$ to $V_3$, respectively. That is, $V_2=d_2$, $V_1=d_1$, and $V_0=d_0$ are obtained, and the signal $V_3$ corresponds to a new value $d_0$ obtained by adding the value $d_0$ of the signal $V_0$ and a deviation e (difference of rotation number) input from the subtracter 3 using the adder 5b.

These values d are sequentially shifted to the downstream side (the right side in FIG. 6) for each sample.

Accordingly, the values d of the signals $V_0$ to $V_3$ are also sequentially switched.

In a case of i=1 (that is, $d_1$), as shown in FIG. 7, the values d corresponding to the signals $V_2$, $V_1$, and $V_0$ are shifted by one from the state of FIG. 6 to the right side. That is, the signal $V_2$ corresponds to the new value $d_0$, the signal $V_1$ corresponds to the value $d_2$, and the signal $V_0$ corresponds to the value $d_1$. The signal $V_3$ corresponds to a new value $d_1$ obtained by adding the value $d_1$ of the signal $V_0$ and the deviation e using the adder 5b.

In a case of i=2 (that is, $d_2$), as shown in FIG. 8, the values d are shifted by one from the state of FIG. 7 to the right side of FIG. 7. That is, the signal $V_2$ corresponds to the new value $d_1$, the signal $V_1$ corresponds to the value $d_0$, and the signal $V_0$ corresponds to the value $d_2$. The signal $V_3$ corresponds to a new value $d_2$ obtained by adding the value $d_2$ of the signal $V_0$ and the deviation e using the adder 5b.

As understood from above, the signals V are variables at fixed positions, and the values d stored in the memory corresponding to the signals V are sequentially shifted to the right side in FIGS. 4 to 8 every time i is increased by one. In addition, the following expression is made between the signals V and the values d.

$$V_N = e + d_i$$

$$V_{N-1} = d_{i-1}$$

$$V_{N-2} = d_{i-2}$$

$$\ldots$$

$$V_1 = e + d_{i-N+1} = d_{i+1}$$

$$V_2 = e + d_{i-N} = d_i$$

The value $d_i$ is defined as follows.

$$\ldots = d_{i-N} = d_i = d_{i+N} d_{i+2N} = \ldots \quad \text{[Expression 2]}$$

Figure 9:
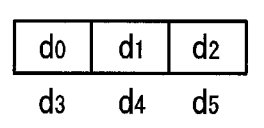

That is, for example, in a case of N=3, as shown in FIG. 9, when the values d are sequentially obtained as $d_1$, $d_2$, $d_3$, $d_4$, $d_5$, etc., the values d of a preceding cycle of the upper stage are rewritten corresponding to the values d of the next cycle of the lower stage. As a result, $d_0+N=d_{0+3}=d_3$ is obtained, and in the same memory, the value $d_3$ is stored at the same position as the value $d_0$.

As described above, the repetitive control portion 5 is a type of learning control system which reduces the deviation e by continuously performing the repetitive operation using the deviation e of one preceding cycle.

As described above, the switching of the cycle is performed when the reset signal output from the reset signal generation portion 4 is input to the repetitive control portion 5.

This reset signal is generated using a pressure waveform of the compressor in Example 1.

The generation of the reset signal in the reset signal generation portion 4 will be described based on FIGS. 10A to 10D.

In this example, a case in which the discharge pressure fluctuates 10 times during one rotation of the compressor will be shown as an example.

Figure 10:
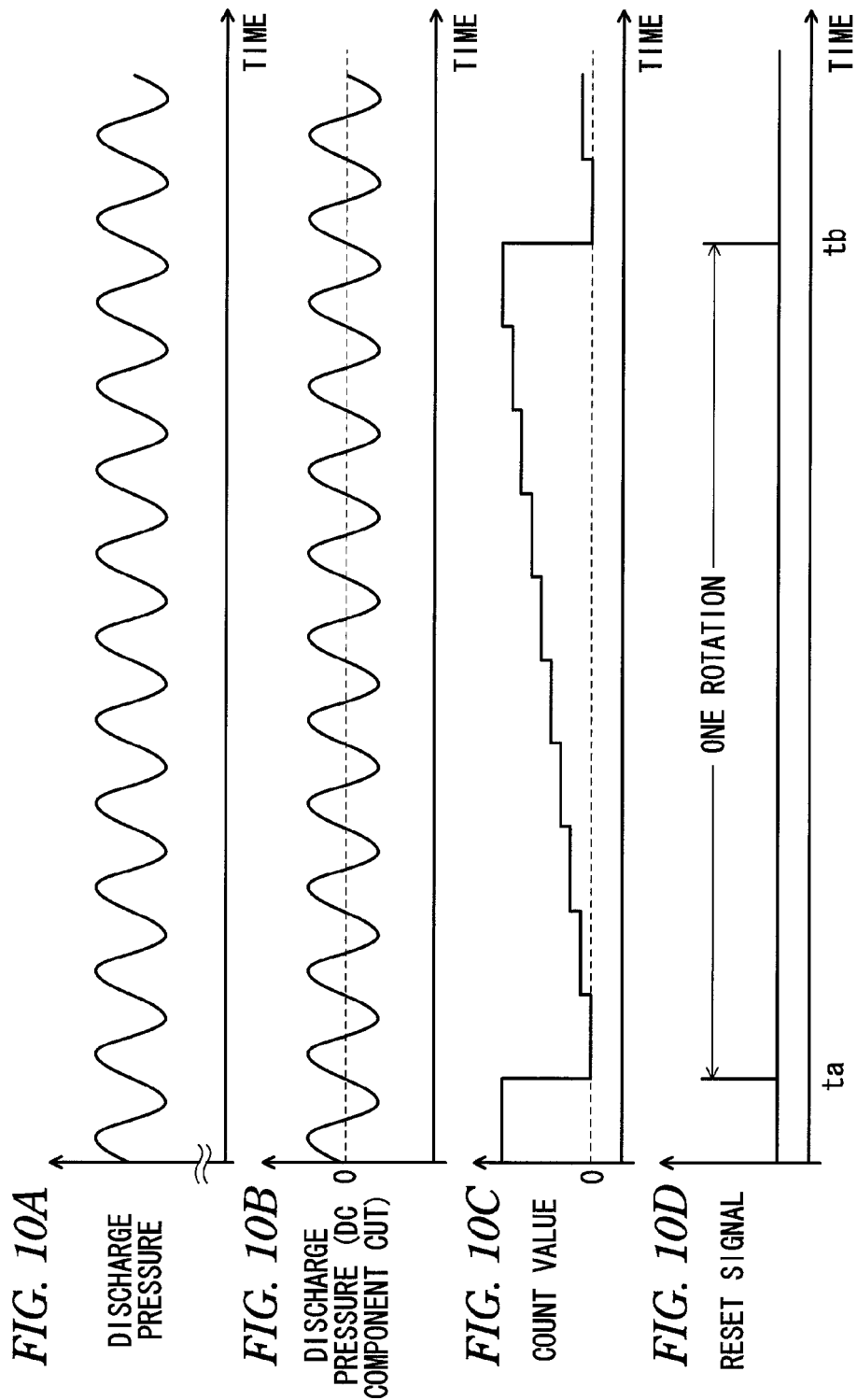
FIGS. 10A to 10D show diagrams illustrating a method of generating a reset signal for switching a cycle in the repetitive control portion.

FIG. 10A shows a pressure waveform detected by the compressor pressure detecting portion 1. The pressure of the compressor has a pressure waveform cyclically fluctuating with a suction process, a compression process, and a discharge process.

Regarding a DC component of the pressure signal obtained as described above, a part below the dotted line is cut using a high-pass filter as shown in FIG. 10B.

As shown in FIG. 10C, the pressure signal passing through the high-pass filter is counted up at the time when the value thereof exceeds 0. The counting-up is reset at the time when the count reaches 10 from 9.

Therefore, as shown in FIG. 10D, the reset signal generation portion 4 generates a reset signal for each reset time (indicated by a time ta and a time tb in FIG. 10D) and outputs the signal to the repetitive control portion 5, and the cycle is switched.

Since it is not necessary for the low-pass filter 6 to control the deviation of a high frequency component by following a target rotation number, a high frequency component is cut from an output signal u of the repetitive control portion 5 and output to an adder 8.

In this example, in the estimation of the rotation speed of the motor in the estimated rotation speed calculation portion 7, an error related to the rotation of the motor is calculated once and used to estimate the rotation speed, and thus the repetitive control portion 5 is allowed to be applied and the estimation accuracy of an estimated rotation speed $\omega\_{est}$ is thus improved.

In this example, an angle error is used as the error related to the rotation.

Based on such a purpose, the estimated rotation speed calculation portion 7 has a flux observer 7a, an angle error calculation portion 7b, and a speed calculation portion 7c.

In the flux observer 7a, identification is performed using a mathematical model of the motor based on a dq-axis current value $i_{dq}$ output from a motor model 13 and a command dq-axis voltage value $V_e$ output from a current proportional integral controller 11 to calculate motor current flux estimation errors $\Delta\lambda_\gamma$ and $\Delta\lambda_\delta$ of a γ axis and a δ axis, and the result is input to the angle error calculation portion 7b.

The angle error calculation portion 7b calculates an angle estimation error $\theta\_{est}$ by performing angle estimation error calculation based on the motor current flux estimation errors $\Delta\lambda_\gamma$ and $\Delta\lambda_\delta$ input from the flux observer 7a.

The speed calculation portion 7c obtains an estimated rotation speed value $\omega\_{est}$ by PI control based on the angle estimation error $\theta\_{est}$ input from the angle error calculation portion 7b, and inputs the obtained value to the subtracter 3.

The adder 8 adds the output value from the LPF 6 to the rotation speed difference (deviation e) from the subtracter 3, and outputs the obtained value to a speed proportional integral controller (speed PI controller) 9.

The speed proportional integral controller 9 performs PI control on the output value of the adder 8 using a proportional gain and an integral gain constant to calculate a command motor current $i_\theta$ which is a drive command signal (which is the same as a torque command value signal), and outputs the obtained value to a subtracter 10.

The subtracter 10 subtracts the output value $i_{dq}$ from the motor model 13 from the command motor current $i_\theta$ and outputs the result to the current proportional integral controller (current PI controller) 11.

The current proportional integral controller 11 performs PI control using a proportional gain and an integral gain constant based on the correction command motor current output from the subtracter 10 by dividing into a command current of the d axis and a command current of the q axis, and outputs an axis voltage command value $V_e$ to the estimated rotation speed calculation portion 7, a subtracter 12, and an inverter 20.

The current proportional integral controller 11 and the speed proportional integral controller 9 correspond to the drive command signal generation portion of the invention.

The subtracter 12 subtracts a value obtained by multiplying the estimated rotation number by a torque constant K from the output value from the current proportional integral controller 11 to calculate a motor voltage $V_0'$, and outputs the calculated value to the motor model 13.

The motor model 13 which is used to show characteristics of the motor from inductance L and winding resistance R of coils of the motor calculates an actual motor current $i_e'$ (which is the same as the motor torque) from an output $V_e'$ of the subtracter 12, L, and R, and outputs the result to an adder 14. K is a torque constant.

The adder 14 adds the output value of the motor model 13 to the output value from the sin function generator 19, and outputs the result to a load model 15 as a motor torque T including a load fluctuation component.

The load model 15 which is used to show load characteristics of the electric compressor from an all-inertial moment J and a viscous friction coefficient D of the motor shaft obtains an estimated rotation speed $\omega_{out}$ from the output value T, J, and D based on an equation of motion of the motor.

The estimated rotation speed $\omega_{out}$ is output to a feedback gain portion 16 and an integrator 17.

The feedback gain portion 16 calculates a correction voltage $V_e''$ by multiplying the estimated rotation speed $\omega_{out}$ by the torque constant K, and outputs the result to the subtracter 12.

The integrator 17 integrates and converts the estimated rotation speed $\omega_{out}$ into a rotation position (rotation angle), and outputs the result to a coefficient multiplier 18.

The coefficient multiplier 18 multiplies the rotation position obtained by the integrator 17 by n (order of rotational fluctuation) and outputs the result to the sin function generator 19.

In the sin function generator 19, a sin function depending of the rotation angle obtained by the coefficient multiplier 18 is generated and output to an adder 14 as a load fluctuation component of the electric compressor.

The command voltage of the d axis and the command voltage of the q axis of the motor obtained by the current proportional integral controller 11 are output to the known inverter 20 to drive and control the motor.

Next, results of a simulation in which a rotation error is generated by applying a disturbance to the control device for an electric compressor configured as described above will be described.

A noise signal of 1 rad/s as a disturbance signal $n_d$ was applied to the estimated rotation speed $\omega_{out}$ obtained in the generation of a delay time of the load model 15 to obtain an estimated rotation speed having a rotation error.

The order n of the rotational fluctuation was set to 10, Wref and Wref_min were set to 2π×10 rad/s, and the sampling cycle Ts was set to $1.0\times10^{-4}$ s. In addition, the number of stages N of the delay device 5a was set to 1,000, and in a conventional repetitive control portion, the reset signal was set to be output when i was 1,000 in order to make a comparison.

The resistance coefficient R was set to 0.85Ω, the inductance L was set to 1.2 mH, the viscous friction coefficient D was set to $8.34\times10^{-5}$, the inertial moment J was set to $0.7\times10^{-4}$, and the torque coefficient K was set to 0.076 Nm/A.

Figure 11:
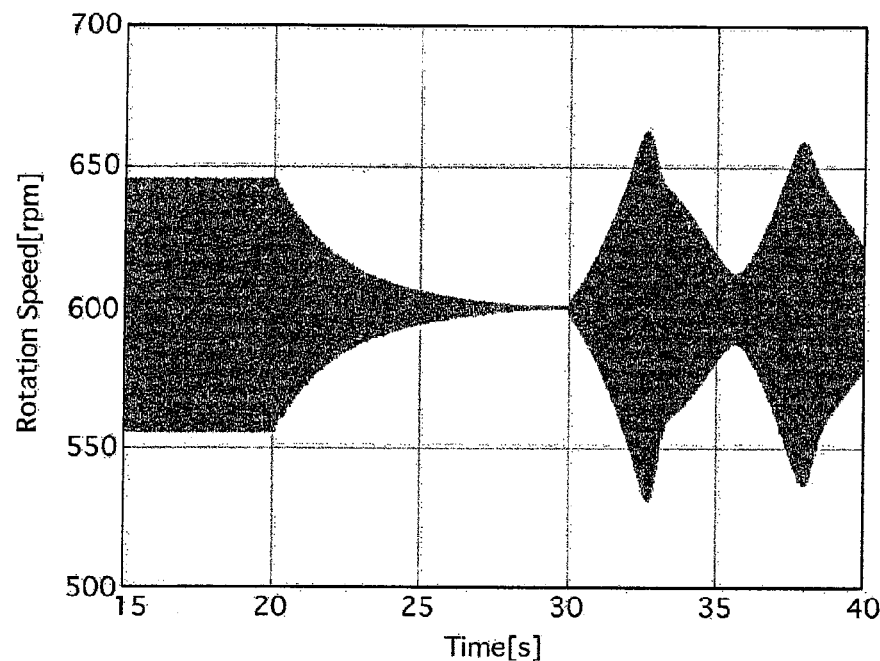
FIG. 11 is a diagram showing a result of a disturbance simulation with conventional normal repetitive control.
Figure 12:
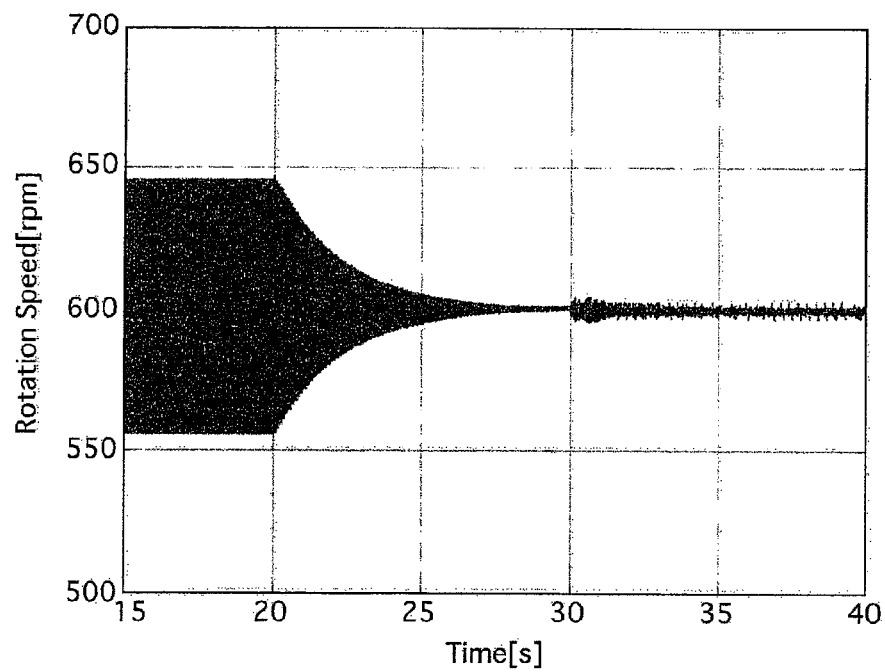
FIG. 12 is a diagram showing a result of a disturbance simulation with repetitive control of Example 1.
Figure 13:
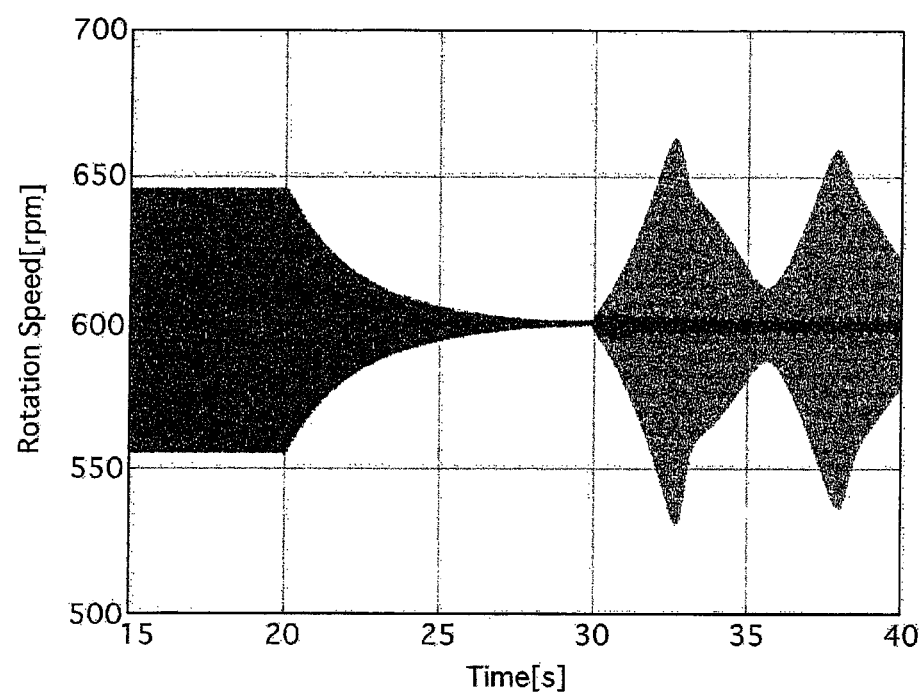
FIG. 13 is a diagram showing the results of disturbance simulations of the conventional normal repetitive control and the repetitive control of Example 1 in a comparison manner.

The results are shown in FIGS. 11 to 13. In these drawings, the horizontal axis indicates an elapsed time and the vertical axis indicates an estimated rotation speed $\omega_{out}$.

FIG. 11 is based on a conventional normal repetitive control and shows the result of an operation in which the repetitive control is started after 20 seconds and a speed estimation error of $n_d$=1 rad/sec is applied at 30 seconds. It is found that after 30 seconds, the estimated rotation number $\omega_{out}$ fluctuates within the range of approximately +65 rpm to −65 rpm around 600 rpm.

In the repetitive control of Example 1, when the simulation is performed with the same settings as the above-described conventional normal control, it is found that as shown in FIG. 12, the estimated rotation number $\omega_{out}$ fluctuates at 30 seconds within the range of approximately +5 rpm to −5 rpm around 600 rpm, but falls within the range of approximately +1.7 rpm to −1.7 rpm within a short amount of time. That is, in the control of Example 1, the fluctuation is 1/10 or less than that in the conventional control.

For simplicity, FIG. 13 shows the simulation results of the conventional normal control and the control of Example 1 together. The light part indicates the result of the conventional normal control and the dark part indicates the result of Example 1.

Next, a reason for accurately setting a reset timing for each rotation in Example 1 will be described based on FIG. 14.

Figure 14:
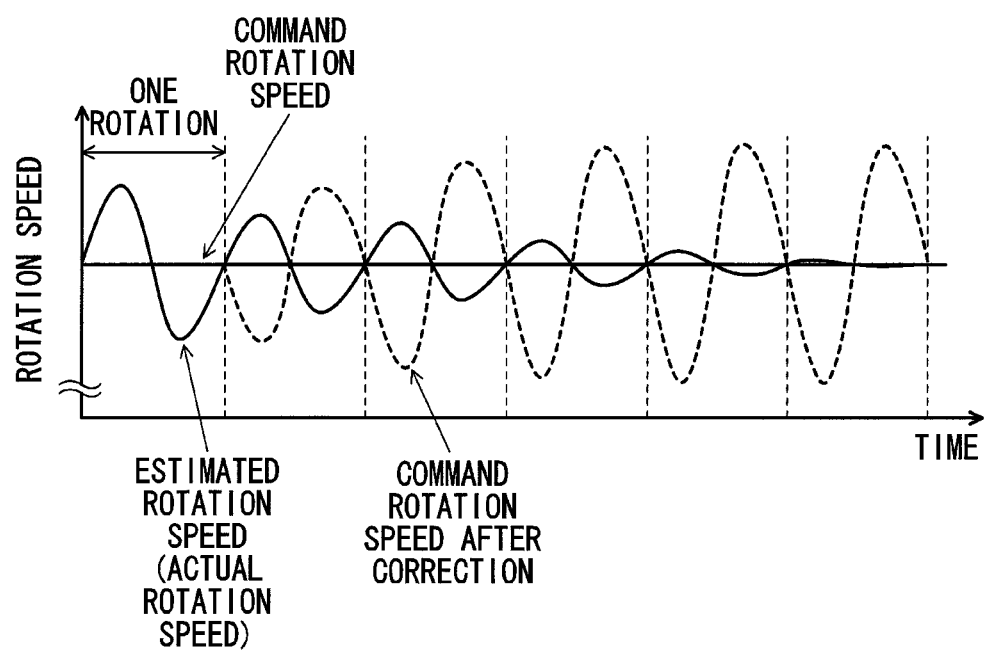
FIG. 14 is a diagram illustrating a reason for accurately setting a reset timing for each rotation in the repetitive control.

In FIG. 14, the horizontal axis indicates an elapsed time, the vertical axis indicates a rotation speed, the horizontal thin line indicates a command rotation speed, the solid line indicates an estimated rotation speed (will be treated as an actual rotation speed), and the broken line indicates a command rotation speed after correction.

Based on the deviation between a command rotation speed and an estimated rotation speed in one previous rotation, a command speed in the next one rotation is corrected as indicated by the broken line. When the value of the command rotation speed is corrected to the increase side in a case in which the estimated rotation speed is smaller than the command rotation speed, and the command rotation speed is corrected to the reduction side in the reverse case, the value of the estimated rotation speed becomes gradually consistent with the command rotation speed, and thus the correction amount does not change.

Therefore, the repetitive control can be applied only to a cyclic fluctuation, and thus when the reset timing does not exist for each rotation (that is, when the reset timing does not match the load fluctuation cycle), the above-described correction does not successively act. Accordingly, reset should be accurately performed for each rotation.

In Example 1, in a compressor in which a cyclic load fluctuation is generated, since one rotation can be accurately determined from a pressure waveform of the compressor, the repetitive control can be applied well.

The control device for an electric compressor of Example 1 can obtain the following effects.

That is, in the control device for an electric compressor of Example 1, the repetitive control portion 5 performs a repetitive operation using a rotation speed difference between a target rotation speed $\omega_{ref}$ of one preceding cycle and an estimated rotation speed $\omega_{out}$ to reduce the rotation speed difference and to thus suppress a disturbance. However, in that case, since the cycle switching timing in the repetitive control portion 5 is determined according to the pressure fluctuation of the compressor in the reset signal generation portion 4, the drive motor of the compressor can be successively controlled with respect to the load fluctuation having complicated frequency components even when the motor is controlled in a sensorless manner.

In addition, in the reset signal generation portion 4, since the number of load fluctuations of the compressor is counted by detecting a discharge pressure of the compressor, the timing of one cycle can be easily and securely detected.

The invention has been described based on the examples. However, the invention is not limited to these examples, and even when there are modifications in design and the like without departing from the gist of the invention, the invention includes the modifications.

For example, in the reset signal generation portion 4, the number of load fluctuations of the compressor is counted by detecting a discharge pressure of the compressor. However, in place of this, the number of load fluctuations of the compressor may be counted by detecting a suction pressure of the compressor to determine the timing of one cycle.

In addition, the control device for an electric compressor of the invention is not limited to control devices for compressors of vehicular air conditioning devices and may be applied to control devices for other compressors.

The present application is based on Japanese Patent Application No. 2012-245009, filed Nov. 7, 2012, the content of which is incorporated herein by reference. In addition, all references cited herein are incorporated by reference in their entirety.

DESCRIPTION OF REFERENCE NUMERALS AND SIGNS

1: COMPRESSOR PRESSURE DETECTING PORTION
2: TARGET ROTATION SPEED SETTING PORTION
3: SUBTRACTER
4: RESET SIGNAL GENERATION PORTION
5: REPETITIVE CONTROL PORTION
5a: DELAY DEVICE
5b: ADDER
5c: COEFFICIENT MULTIPLIER
6: LOW-PASS FILTER
7: ESTIMATED ROTATION SPEED CALCULATION PORTION
7a: FLUX OBSERVER
7b: ANGLE ERROR CALCULATION PORTION
7C: SPEED CALCULATION PORTION
8: ADDER
9: SPEED PROPORTIONAL INTEGRAL CONTROLLER (SPEED PI CONTROLLER)
10: SUBTRACTER
11: CURRENT PROPORTIONAL INTEGRAL CONTROLLER (CURRENT PI CONTROLLER)
12: SUBTRACTER
13: MOTOR MODEL
14: ADDER
15: LOAD MODEL
16: FEEDBACK GAIN PORTION
17: INTEGRATOR
18: COEFFICIENT MULTIPLIER
19: sin FUNCTION GENERATOR
20: INVERTER

The invention claimed is:

1. A control device for an electric compressor comprising:
a target rotation speed setting portion which sets a target rotation speed of a motor which drives the compressor;
an estimated rotation speed calculation portion which calculates an estimated rotation speed of the motor;
a repetitive control portion to which a rotation speed difference between the target rotation speed and the estimated rotation speed is input, the repetitive control portion repeating a process in which, a rotation speed difference corresponding to one preceding cycle of the compressor is stored, a present rotation speed difference is added to the rotation speed difference corresponding to the one preceding cycle, and a next rotation speed difference corresponding to next one preceding cycle is added to a rotation speed difference obtained as the addition result, thereby outputting one rotation speed difference of the stored rotation speed differences;
a drive command signal generation portion which generates a drive command signal of the electric motor, to remove the rotation speed difference between the target rotation speed and the estimated rotation speed, based on the present rotation speed difference and the output value of the repetitive control portion;

a pressure detecting portion which detects a pressure value of the compressor; and a reset signal generation portion to which the pressure value of the compressor is input to calculate a timing of one rotation of the compressor by counting the number of predetermined parts of load fluctuations of the compressor based on the pressure value, thereby outputting a reset signal to the repetitive control portion according to the timing, wherein the repetitive control portion receives the reset signal and switches the cycle to the next cycle.

2. The control device for an electric compressor according to claim 1, wherein the reset signal generation portion counts the number of load fluctuations of the compressor by detecting an inlet pressure or a discharge pressure of the compressor.

* * * * *